(12) United States Patent
Davis

(10) Patent No.: US 6,575,481 B1
(45) Date of Patent: Jun. 10, 2003

(54) PICNIC TABLE DOLLY AND METHOD THEREFOR

(76) Inventor: Jeffrey L. Davis, P.O. Box 274, Syracuse, OH (US) 45779

(*) Notice: Subject to any disclaimer, the term of this patent is extended or adjusted under 35 U.S.C. 154(b) by 0 days.

(21) Appl. No.: 09/306,814

(22) Filed: May 7, 1999

(51) Int. Cl.$^7$ ................................................ B62B 1/12
(52) U.S. Cl. ............................ 280/47.17; 280/47.32; 280/47.19; 280/78
(58) Field of Search ............................ 280/638, 35, 42, 280/43.1, 47.131, 47.17, 47.19, 47.29, 47.3, 47.315, 47.32, 78, 79.7; 52/122.1, 143; 135/85, 912; 248/298.1, 288.1

(56) References Cited

U.S. PATENT DOCUMENTS

| | | | | |
|---|---|---|---|---|
| 1,133,310 A | * | 3/1915 | Nash | 294/15 |
| 1,397,456 A | * | 11/1921 | Robinson | 248/298.1 |
| 1,506,345 A | * | 8/1924 | Janovsky | 248/298.1 |
| 2,010,490 A | * | 8/1935 | Jones | 254/8 |
| 2,551,040 A | | 5/1951 | Newell | 280/61 |
| 2,636,626 A | * | 4/1953 | Ireland | 214/383 |
| 2,683,461 A | * | 7/1954 | Kinney | 135/45 |
| 2,707,963 A | * | 5/1955 | Goynes | 135/63 |
| 2,718,405 A | * | 9/1955 | Casey | 280/35 |
| 2,782,947 A | * | 2/1957 | Linsel | 214/373 |
| 2,904,345 A | | 9/1959 | Bradley | 280/47.13 |
| 2,967,730 A | * | 1/1961 | Vann | 294/15 |
| 2,983,520 A | * | 5/1961 | Klages | 280/47.19 |
| 2,986,627 A | * | 5/1961 | Marriett | 248/298.1 |
| 3,052,323 A | * | 9/1962 | Hopfeld | 187/10 |
| 3,170,708 A | * | 2/1965 | Miller | 280/47.32 |
| 3,375,019 A | * | 3/1968 | O'Day | 280/47.32 |
| 4,505,489 A | | 3/1985 | Specie | 280/47.13 R |
| 4,544,051 A | * | 10/1985 | Saltz | 190/124 |
| 4,550,813 A | * | 11/1985 | Browning | 190/18 A |
| 4,566,708 A | | 1/1986 | Specie | 280/47.13 R |
| D303,031 S | | 8/1989 | Ellis | D34/31 |
| 4,852,895 A | | 8/1989 | Moffitt | 280/47.131 |
| 4,869,517 A | * | 9/1989 | Smith | 280/47.3 |
| 4,934,719 A | | 6/1990 | duPont | 280/47.131 |
| 5,232,233 A | * | 8/1993 | Jedora | 280/47.331 |
| D340,340 S | * | 10/1993 | Allen | D34/28 |
| 5,361,569 A | * | 11/1994 | Schupman et al. | 56/228 |
| 5,395,130 A | * | 3/1995 | Rubin | 280/304 |
| 5,427,393 A | * | 6/1995 | Kriebel | 280/47.28 |
| 5,695,230 A | * | 12/1997 | Thompson | 294/15 |
| 5,697,624 A | * | 12/1997 | Faraj | 280/47.19 |
| 5,755,451 A | | 5/1998 | O'Connor | 280/47.32 |
| 5,782,600 A | | 7/1998 | Walsh | 414/490 |
| 5,823,551 A | * | 10/1998 | Conroy | 280/47.131 |
| D408,111 S | * | 4/1999 | Cook | D34/24 |
| D409,673 S | * | 5/1999 | Rodriguez, II | D21/421 |

FOREIGN PATENT DOCUMENTS

DE 458728 * 3/1928 ................. 280/814

* cited by examiner

Primary Examiner—Brian L. Johnson
Assistant Examiner—Bridget Avery
(74) Attorney, Agent, or Firm—Robert N. Blackmon

(57) ABSTRACT

A picnic table moving system having a wheeled attachment connected to a first end of a picnic table and a pair of handles attachable to a second end of a picnic table. The picnic table moving system has a wheeled attachment which attaches to the crossbar and upper support bar of a picnic table to position the wheel underneath the first end of the table. A jacking system may be incorporated into the attachment to lift the table onto the wheel. Handles provided at the other end lock onto the crossbar or similar surface of the picnic table to provide leverage and stability when lifting the table onto the wheel and when rolling the table around on the wheel during transportation of the table.

18 Claims, 5 Drawing Sheets

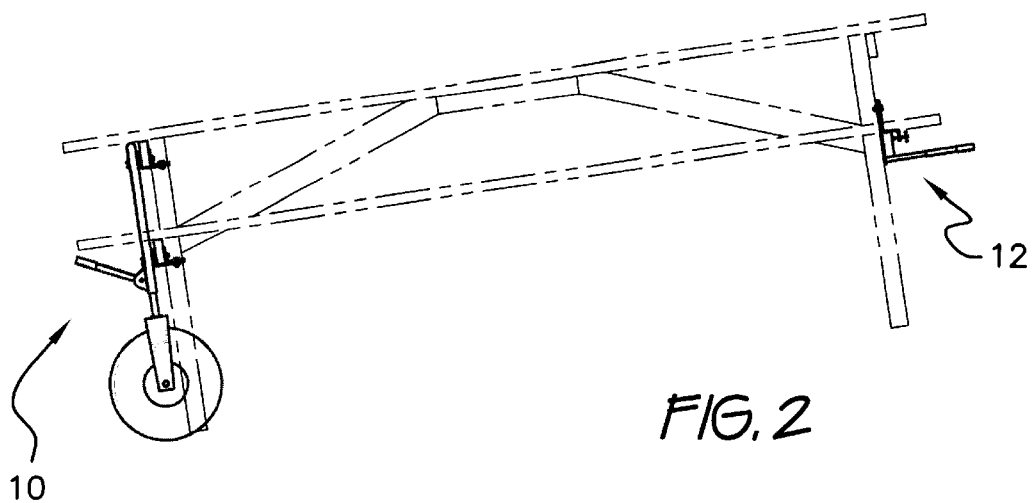
FIG. 2
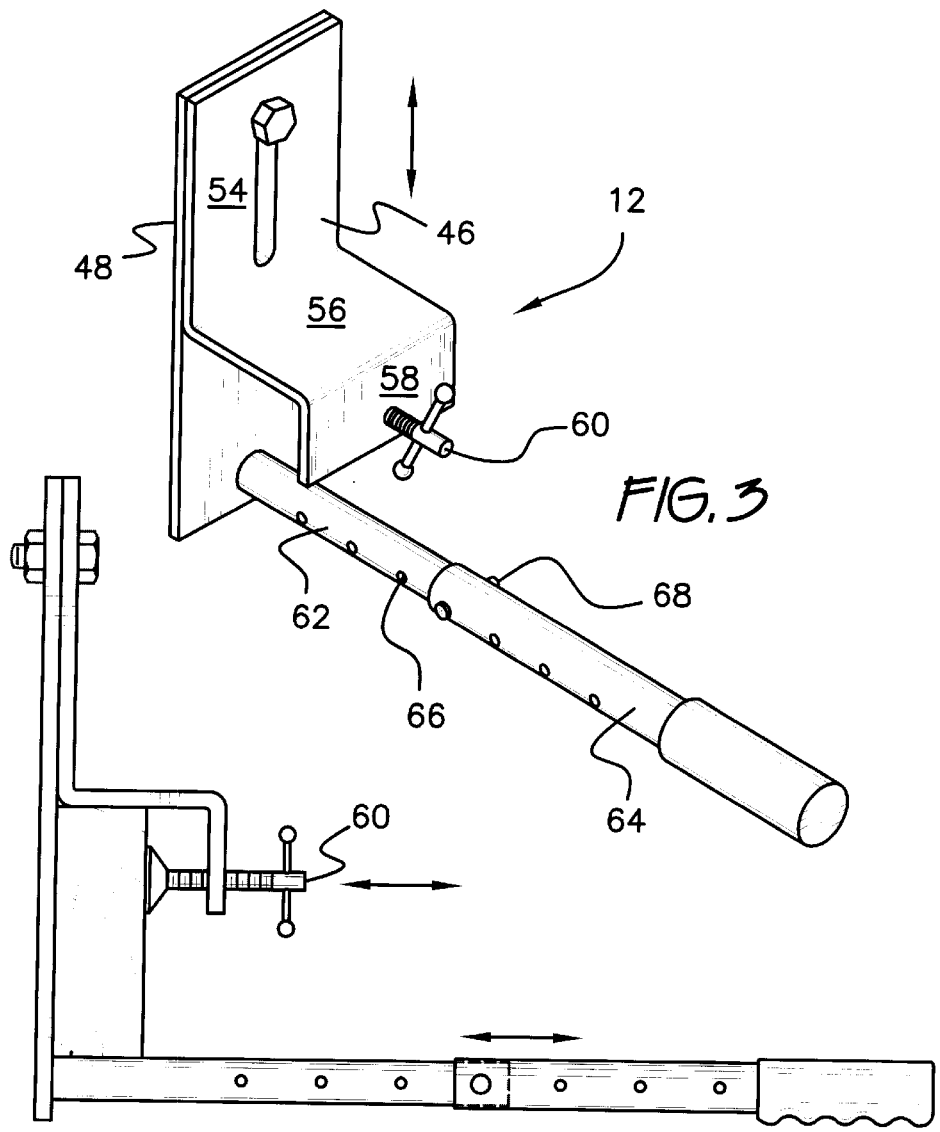
FIG. 3
FIG. 4

PICNIC TABLE DOLLY AND METHOD THEREFOR

BACKGROUND OF THE INVENTION

1. Field of the Invention

The present invention relates to a dolly for moving a picnic table by attaching a wheeled attachment to a first end of a picnic table and attaching a pair of handles to a second end of the picnic table to form a dolly wherein the picnic table forms the central frame of the dolly.

2. Description of the Prior Art

The use of dollies is well known. Specialized dollies have previously been adapted for moving specific pieces of furniture or equipment. Examples include U.S. Pat. No. 2,551,040 to Newell showing a wheeled attachment for placing at the rear of a sailboat.

U.S. Pat. No. 5,755,451 to O'Connor shows a similar device for attaching a wheel to the aft section of a sailboat.

U.S. Pat. No. 4,934,719 to duPont shows wheeled attachment for securing about the top and legs of a lawn chair.

U.S. Pat. No. D303,031 to Ellis shows a dolly having arms for attaching to the bottom and sides of a car top for transporting the top.

U.S. Patent Moffitt shows a wheeled attachment for attaching to a table, desk or similar item.

U.S. Pat. No. 5,782,600 to Walsh shows a dolly system providing a flat base beneath a shelf unit for attaching wheels or rollers.

U.S. Pat. Nos. 4,505,489 and 4,566,708 to Specie show a general purpose dolly for a campground having a pair of wheels attachable to the base of a picnic table and a separate wheel attachable to a second end of a picnic table.

U.S. Pat. No. 2,904,345 to Bradley shows a dolly for transporting a trashcan and includes a wheeled base and a hand attached to a circumferentially extending band.

None of the above inventions and patents, however, taken either singly or in combination, is seen to describe the instant invention as claimed.

The current invention is to a system for moving a picnic table. A table barrow system is formed by a wheeled attachment and two handles attached to a picnic table. The wheel attachment is designed to mate with the crossbar and table surface of a picnic table to support the table above the wheel. A pair of handles having a grip at one end and a curved bracket at the other end are attachable to the crossbar at the opposite end of the table and extend outwardly from the table. By grasping the handle grips in each hand and lifting the table to load the wheel of the wheel attachment, the table can be moved in a manner similar to a wheel barrow. To adapt to different picnic table designs, the bracket of the handles may be adjustable to grip bars of different dimensions. Likewise the wheel attachment has adjustable heights to match picnic tables having varying spreads between the table surface and the crossbar.

SUMMARY OF THE INVENTION

Accordingly, it is a principal object of the invention to provide a table barrow system having a wheeled attachment attachable to a front end of a picnic table and a pair of handle units for attachment to a second end of the table for lifting the table onto the front end wheel during transportation of the table.

It is another object of the invention to provide an adjustable bracket on the handles for attaching the handles to a crossbar of the picnic table independent of the dimensions of the crossbar. The handles may also having a telescoping section for varying the leverage applied to the table and for aiding attachment of the bars to the table.

It is a further object of the invention to provide a first and second platform on the wheel attachment for connecting to the crossbar and table of the picnic table to steady the wheel beneath the picnic table.

Still another object of the invention is to provide a jack on the wheel attachment to allow the wheel attachment to be placed under the table while the table is resting on the ground and jacking or elevating the table above the wheel to allow the table to be moved.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a side elevational view of the table barrow system according to the present invention installed on a picnic table.

FIG. 3 is a perspective view of a handle unit of the table barrow according to a first embodiment of the handle.

FIG. 4 is a side elevational view of the handle according to the first embodiment installed about the crossbar of a picnic table shown in cross-section.

Similar reference characters denote corresponding features consistently throughout the attached drawings.

DETAILED DESCRIPTION OF THE PREFERRED EMBODIMENTS

Figure 1:
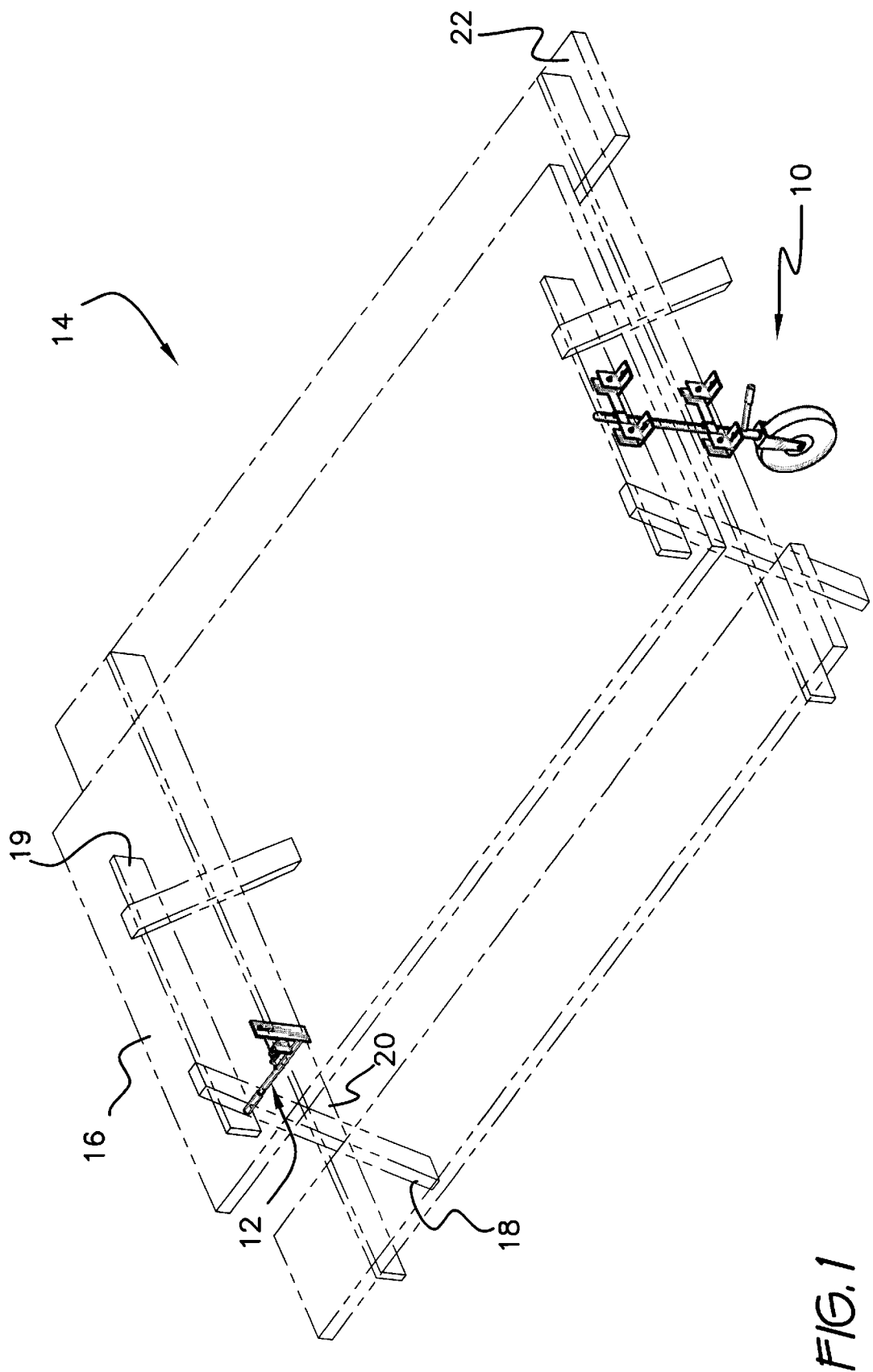
FIG. 1 is environmental perspective view of the table barrow according to the present invention installed on a picnic table.

The present invention is a table barrow system for moving a picnic table. As best seen in FIG. 1, a wheel attachment 10 and handle unit ("handle") 12 are shown attached at opposite ends of a standard picnic table. As is well known in the art, the standard picnic table has an upper surface 16 made from a number of planks (not shown) or equivalent materials. The upper surface is supported by a plurality of legs 18 which are secured in pairs at the top end by support bars 19 and about their center by crossbar members ("crossbars") 20. A number of horizontal seats 21 are secured at opposite ends of the crossbars 20 to rest at a predetermined distance below the table surface 16.

The picnic tables are typically deployed about a park, yard, or open area during the spring or early summer and removed for storage in the fall to protect the tables from inclement weather, to perform repairs, or to prevent the tables from being vandalized during the fall and winter months. It is currently the practice of custodians of the tables to place one person at each end of the table, lift the table, and carry the table to the desired location. While this practice is effective in achieving the desired result, it has the drawback that it takes two people to perform the task and it wastes a large amount of effort that could be transferred to a simple mechanical device.

Figures 5, 6, 7:
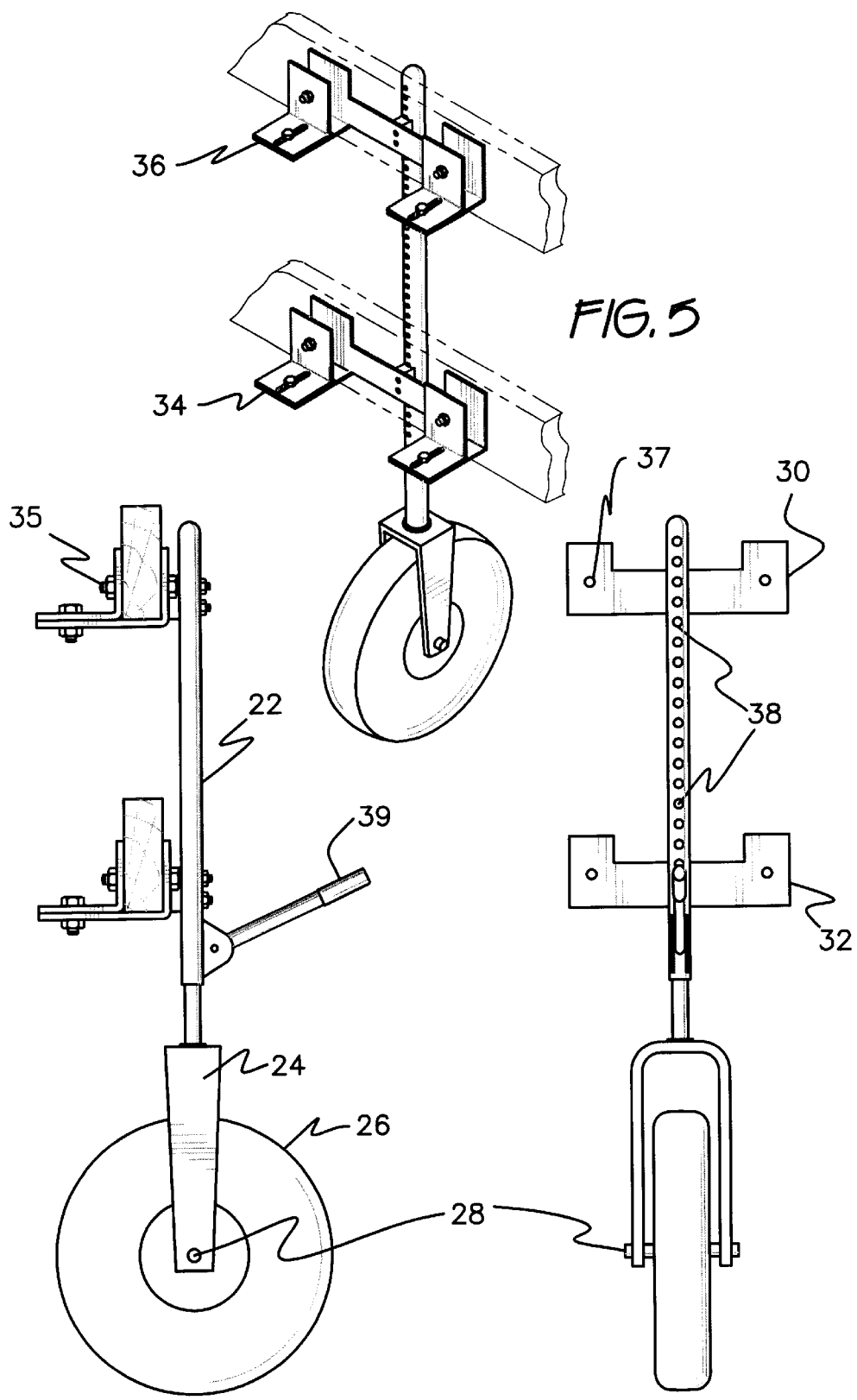
FIG. 5 is a perspective view of the wheel attachment shown attached to a portion of a crossbar of a picnic table.
FIG. 6 is a side elevational view of the wheel attachment shown attached to the crossbar of a picnic table shown in cross-section.
FIG. 7 is a front plan view of the wheel attachment according to the invention.

As best shown in FIGS. 1 and 5–7, to solve this problem, the table barrow of the current invention supplies a wheel attachment that can be attached to a picnic table. The attachment has a vertical post ("elongated body") 22 extending above a wheel bracket 24 surrounding and attached to a rotatable wheel 26 by an axle 28. The attachment preferably has two arms 30, 32 rotatably connected about their center point to the vertical post 22 of the wheel attachment 10. The lower arm 30 has a pair of brackets 34 sized to receive the crossbar 20 of a standard picnic table as shown in FIG. 1. The upper arm 32 of the wheel attachment has a pair of brackets 36 at opposite ends of the arm to receive the support bar 19 of the picnic table. Each bracket has vertical walls for receiving the bar 19,20 of the table and securing the wheel attachment fixedly to the table. As best shown in FIGS. 5–6, the brackets may be made adjustable by forming the bracket of two L-shaped plates slidably adjustable relative to each other so that the bracket may take on various widths according to the width of the bar 19,20. Thus the brackets may be adjusted to fit securely about the bar with the width of the bracket adjusted to approximately the outer width of the bar. Additionally the bracket 34,36 can be permanently attached to the bar 19,20 by passing a bolt 35 through holes 37 provided in the bracket. One skilled in the art would recognize that instead of passing a bolt through the board, a set screw could be used to secure one side or both sides of the bracket to the bars 19,20.

The length of the vertical post 22 may be provided with through holes 38 for allowing the arms 30,32 to be selectively attached a various heights along the vertical post to compensate for tables of different dimensions and specifically for tables having different spacing between the support bar 19 and the crossbar 20 from a standard table 14. The bars can be pinned or bolted to the vertical post in a number of known manners. The arms preferably can rotate about the vertical post to allow the arms to be rotated in alignment with the vertical post to reduce the overall dimensions of the attachment during storage. The arms may alternately be secured in the horizontal position by addition of a second bolt connecting the arm to the vertical post to prevent the arm from rotating relative to the post.

The vertical post is also preferably telescopic and incorporates a jack or equivalent mechanisms for causing the vertical post 22 to telescope. As shown in FIGS. 6–7, a jack handle 39 is provide on the post to cause the vertical post to telescope in a manner well known to those of ordinary skill in the art through the use of a cooperating ratcheting system or equivalent means. Various other threaded telescoping devices could also be used to provide the telescoping capability. In operation, the wheel attachment can is reduced to its shortest height by compressing the telescoping post and then placed underneath the picnic table without having to lift the picnic table, or at least minimizing the height that the table must be lifted to insert the jack. The jack handle can then be operated to cause the vertical post to telescope, thereby lifting the table above the wheel such that the wheel can rotate freely and the table will not drag along the ground when the table is moved about on its wheel. With the wheel thus in place the opposite end may be lifted by its upper surface, crossbar, legs, seats or other surface to load the weight of the table on to the wheel to transport the table to another location.

While the table may thus be moved without further any further components, it has been found that it requires a great deal of effort by the user to move the table in the manner described. In particular, it is difficult to lift the table by the table edge and steer the table on the single wheel. In order to provide additional balance to the table and to provide additional leverage in lifting the table, handles units 12, according to the present invention, can be installed on the end of the table opposite the wheel attachment. Two embodiments of the handle unit are shown in the figures. The adjustable handles are shown in FIGS. 1–4. The fixed or non-adjustable handles are shown in FIGS. 8A–D.

Figure 8A:
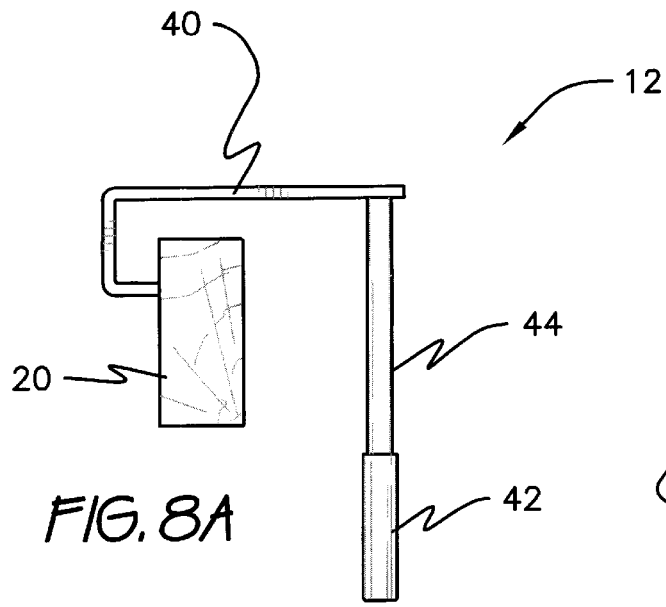
FIGS. 8A–D shown the installation of a handle unit according to a second embodiment of the invention onto a picnic table crossbar.

Referring now to FIGS. 8A–D, the description of the handles and their installation onto the table will be described. FIG. 8A shows a handle according to the second embodiment of the invention ready to be installed on the crossbar (shown in cross-section). While the installation of one handle will be described, it is preferred that the handles are installed in pairs at a sufficient width apart to stabilize the table when the table is balanced on the wheel during transportation.

Figure 8B:
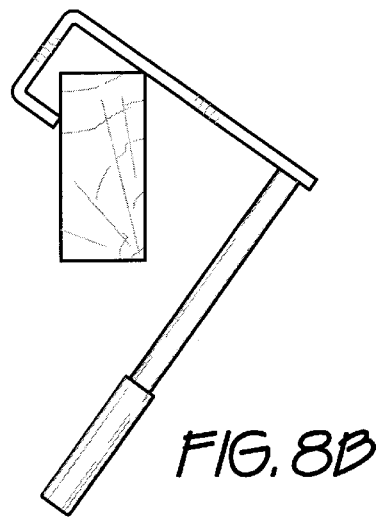
Figure 8C:
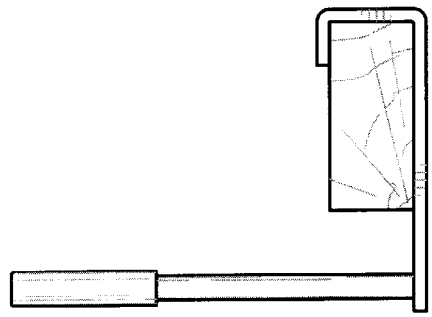
Figure 8D:
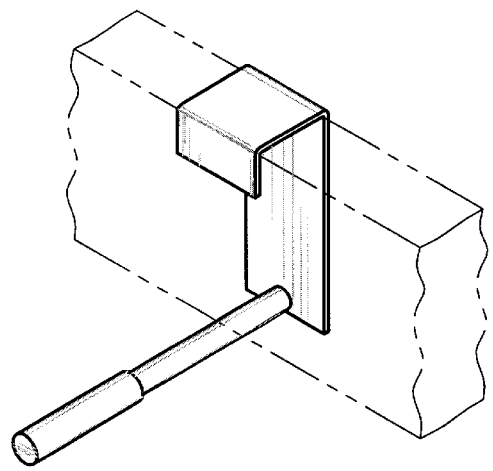

The handle unit 12 has a bracket section 40 at one end consisting of three 90 degree bends nearly approximating the outer profile of a standard picnic table crossbar for engaging with the crossbar of the picnic table to secure the handle thereon. A post 44 extends from one end of the bracket and has a handle grip 44 attached to an end opposite the bracket. The grip may be covered in plastic or other suitable material to provide a comfortable, non-slip surface for gripping the handle. In operation the bracket 40 of the handle is slid over the top of the crossbar (between the crossbar and the support bar) as in FIG. 8A. With one end of the bracket engaging the side of the crossbar 20, the handle is pulled and rotated downwardly as shown in FIG. 8B to cause the crossbar to slip into the crook of the bracket 40 to the position as shown in FIG. 8C.

Because the inner dimension of the bracket closely approximates the outer dimension of the crossbar, the crossbar fits securely within the bracket 40. Additionally, the length of the bracket is preferably only a slight percentage larger than the height of the cross bar so that when the handle is used to lift one end of the picnic table the handle will rise vertically relative to the crossbar until the bottom of the crossbar rests on the handle post. The bracket is dimensioned so that the crossbar cannot slip out of the bracket when the table is so lifted, and because of the tight clearance of the sidewalls of the crossbar with the bracket, the handles remain securely in place along the crossbar. When the table is turned to the left or right during transportation, the edges of the brackets on the handles tend to bite into the crossbar increasing the friction between the handle and the crossbar to keep the handles in place rather than sliding along the crossbar.

Referring to FIGS. 3 and 4, a adjustable handle according to the other embodiment of the invention will be described. While research shows that the overwhelming majority of picnic tables share a common crossbar dimension, it may be anticipated that alternate picnic table crossbar arrangements exist or will be created as designs flow away from wood and standard board dimensions. To compensate for these variations, an adjustable handle has been designed which will mate with crossbars of various dimensions. As best shown in FIGS. 3 and 4, the handle 12 may have various adjustment capabilities built into the handle. Analogous to the wheel unit bracket adjustment, the handle bracket 40 may have cooperating plates 46 and 48 slidably adjustable to each other.

Plate 48 is preferably a flat plate ("back plate") extending orthogonal to the handle post 44 and having a bolt hole (not shown) therethrough for accepting a bolt 50. The front plate 46 has a flat section 54 parallel to and adjacent to a portion of the back plate and has a vertical slot 52 therethrough for receiving the bolt therethrough. The slot is of a predetermined length and cooperates with the bolt to allow the front plate 46 to be moved relative to the back plate 48 while the bolt rides within the slot in a known manner. The front plate 46 further has a bracket forming section comprising an orthogonally projecting middle section 56 extending from a first end of the flat section and ending in a end wall ("end section") 58 parallel to the flat section. The portion of the back plate 48 not covered by the flat section 54 of the front plate 46 forms the back wall of the bracket along with the middle section 56 and the end wall 58 of the front plate which acts in the manner described above on the non-adjustable embodiment of the handle to fit securely around the crossbar of the picnic table. In addition, to further secure the handles to the table a clamp 60 may be provided which is threadedly secured to the end section of the front plate. By threading the clamp inward towards the crossbar 20, additional friction may be applied to the crossbar to secure the crossbar therein. The cooperating bolt 50 and slot 54 may also be used to reduce the amount of space above and below the crossbar and the handle bracket.

The post of the handle is also preferably adjustable. The handle as shown in FIG. 3 has a telescopic section which consists of first and second telescopic lengths 62,64 having through holes 66 spaced a constant distance apart. Maintained within the smaller diameter telescopic section 62 is a spring loaded button 68. In a known manner the button is spring loaded outward to push through a through hole in telescopic section 64 when the holes are aligned with the button. The operator can depress the button into the hole to allow the telescopic section 64 to slide relative to telescopic section 62 until the holes 66 once again align with the buttons 68 to change the length of the post. This feature provides two important advantages, namely leverage and clearance. The length of the post may be increased to provide additional leverage when the handles are used to lift the table. The greater the length, the greater the mechanical advantage of the lever. But more importantly, the clearance feature of the handle is important in installation. When installing the handle onto the crossbar of the table as shown in FIGS. 8A–D, a long handle shaft may cause the grip to hit the ground as the handle is being rotated onto the crossbar, especially if there is a rock or other obstruction on the ground directly beneath the table. By shortening the handle to its shortest length, it should be possible to install the handle around any obstructions.

Figure 9:
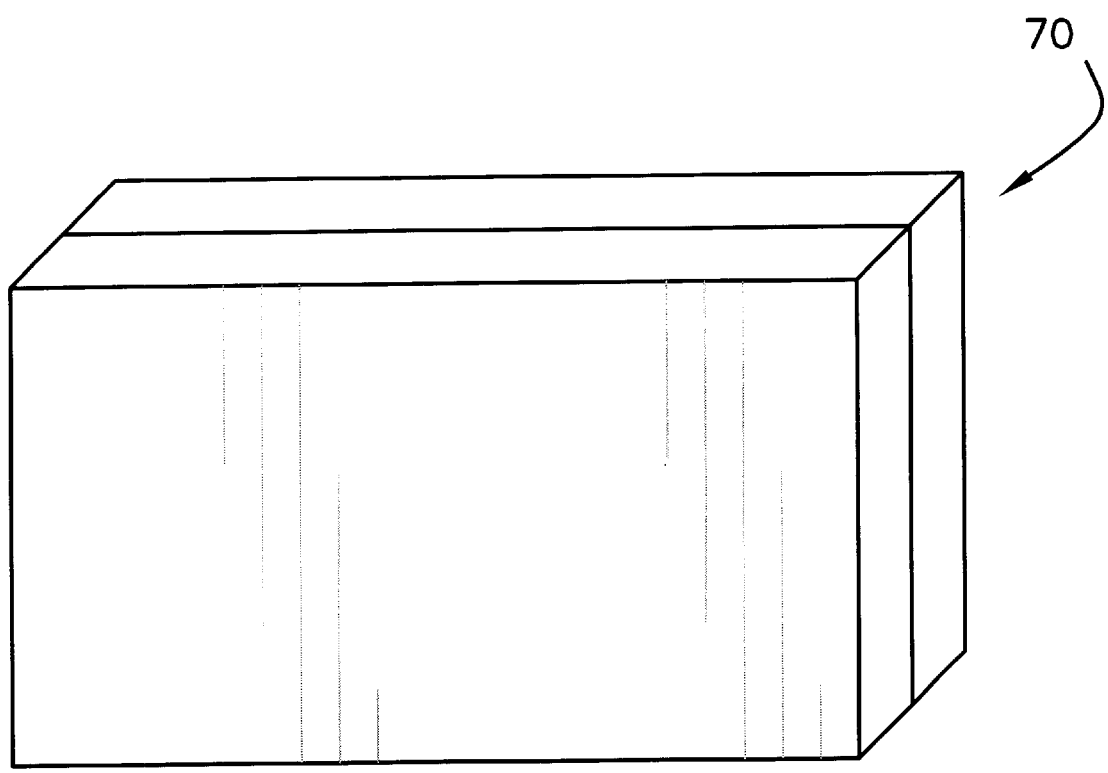
FIG. 9 shows a case for containing a table barrow according to the present invention.

Another important feature of the telescoping handle and wheel attachment is its portability. By rotating the upper and lower arms 30,32 to align with the elongated body or by removing the bolt attaching the arms to the body, the wheel attachment can be easily stored. A case 70 (FIG. 9) having formed form or a similar receptacle could be used to store the wheel unit 10. The handle unit(s) 12 in its non-adjustable embodiment or its adjustable embodiment could also be stored in the case. The case could be a rectangular box having a hinge rotatably connecting the two halves, and having a pair of buckles for securing the two halves in a mating relationship. A case handle and lock could also be provided in a manner known to those skilled in the art to increase portability and enhance security of the device.

One skilled in the art would also appreciate that various changes to the bracket could be made to accommodate crossbars of various shapes and sizes including round, octagonal, square and other geometric and irregular shapes. The handle may also be designed to fit on other bars such as the legs of the picnic table with out exceeding the scope of the invention. It is to be understood that the present invention is not limited to the embodiments described above, but encompasses any and all embodiments within the scope of the following claims.

I claim:

1. A wheeled attachment for a picnic table having a crossbar, said wheeled attachment comprising:

a single central elongated body having a lower first cross arm and an upper second cross arm, and said elongated body further having a wheel rotatably attached at a terminal lower end of said body;

said first arm having brackets mounted at opposite ends for selectively receiving and securing the crossbar of the picnic table;

said second arm having brackets mounted at opposite ends and cooperating with said first arm for selectively receiving an upper portion of said picnic table to fixedly secure the table relative to the elongated body;

whereby said picnic table may be securely lifted onto said wheeled attachment for rolling the picnic on said wheel to a new location.

2. The wheeled attachment according to claim 1, wherein said first arm is selectively rotatably connected to said elongated body about a center point of said first arm.

3. The wheeled attachment according to claim 1, wherein said elongated body includes a telescopic body section intermediate said wheel and said first arm to lift said picnic table above said wheel.

4. The wheeled attachment according to claim 1, wherein said bracket is L-shaped.

5. The wheeled attachment according to claim 1, wherein said bracket is U-shaped.

6. A wheeled attachment for a picnic table having a crossbar, said wheeled attachment comprising:

a single central elongated body having a lower first cross arm and an upper second cross arm, and said elongated body further having a wheel rotatably attached at a terminal lower end of said body;

said first arm having brackets mounted at opposite ends for selectively receiving and securing the crossbar of the picnic table;

said second arm having brackets mounted at opposite ends and cooperating with said first arm for selectively receiving an upper portion of said picnic table to fixedly secure the table relative to the elongated body; and at least one handle unit attachable to a second end of the picnic table for lifting the picnic table onto said wheeled attachment unit and for directing movement of said table in a desired direction;

whereby said picnic table may be securely lifted onto said wheeled attachment for rolling the picnic on said wheel to a new location.

7. The picnic table moving system according to claim 6, wherein said handle unit further comprises:

a grip at a first end of said handle unit and a bracket at a second end of said handle unit, and and elongated post extending between said grip and said bracket.

8. The picnic table moving system according to claim 6, further comprising:

a case for storing the picnic table moving system;

said case comprising mating case halves for surrounding the picnic table moving system and a resilient receiving surface within said case to non-slidingly receive said picnic table moving system.

9. The picnic table moving system according to claim 7, wherein said bracket is substantially the shape of the crossbar of the picnic table.

10. The picnic table moving system according to claim 7, wherein said elongated post of said handle is telescopic.

11. The picnic table moving system according to claim 7, wherein said elongated post of said handle includes first and second telescoping sections having a locking means for fixing the position of said first telescoping section relative to said second telescoping section.

12. The picnic table moving system according to claim 7, wherein said bracket has a first and second adjustment means for adjusting the size of the bracket relative to a size of the crossbar.

13. The picnic table moving system according to claim 12, wherein said wheeled attachment further comprises:

an elongated body having a wheel rotatably attached at a lower end of said body;

a first arm connected to said body selectively attachable to the picnic table for connecting said wheeled attachment to the crossbar of the table;

whereby said picnic table may be lifted onto said wheeled attachment for rolling the picnic table on said wheel.

14. The picnic table moving system according to claim 13, wherein said wheeled attachment first arm is selectively rotatably connected to said elongated body about a center point of said first arm.

15. The picnic table moving system according to claim 13, wherein said wheeled attachment elongated body includes a telescopic body section intermediate said wheel and said first arm to lift said picnic table above said wheel.

16. The picnic table moving system according to claim 13, said wheeled attachment further comprising a second arm connected to said elongated body at an upper end of said body for attaching said upper end of said body to a second area of said picnic table to fix the wheeled attachment relative to the picnic table.

17. The picnic table moving system according to claim 16, wherein:

said first arm has two opposite ends and a center section intermediate said two opposite ends, said first arm center section being selectively rotatably connected to said elongated body;

said first arm further having a crossbar engaging bracket at each of said two first arm opposite ends;

said second arm having two opposite ends and a center section intermediate said two opposite ends, said second arm center section being selectively rotatably connected to said elongated body;

said second arm further having a bracket at each of said two second arm opposite ends for engaging an upper support bar of said picnic table.

18. A picnic table moving system for a picnic table having a crossbar comprising:

a wheeled attachment unit attachable to a first end of the picnic table for transporting the picnic table; and a pair of handle units attachable to a second end of the picnic table for lifting the picnic table onto said wheeled attachment unit and for directing movement of said table in a desired direction;

each of said pair of handles having a grip section and a bracket section extending from said grip for receiving the cross bar of the picnic table therein;

said bracket section having generally a u-shape comprising a first, second and third flange face;

said first upward flange face connected to said grip by a first 90 degree bend;

said second top flange face connected to said first upward flange face by a second 90 degree bend;

said third downward flange face connected to said second top flange face by a third 90 degree bend, wherein said third face is substantially shorter than said first flange face.

* * * * *